US008978041B2

(12) United States Patent
Allen et al.

(10) Patent No.: US 8,978,041 B2
(45) Date of Patent: Mar. 10, 2015

(54) SERVICE VIRTUALIZATION CONTAINER

(75) Inventors: Nicholas Alexander Allen, Redmond, WA (US); Raul Guillermo Camacho, Galena, OH (US); Alexander E. Nosov, Bellevue, WA (US); William Leo Oellermann, Jr., Argyle, TX (US); Kartik Paramasivam, Redmond, WA (US); Ramasubramaniam Poornalingam, Redmond, WA (US); John Anthony Taylor, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1494 days.

(21) Appl. No.: 12/342,492

(22) Filed: Dec. 23, 2008

(65) Prior Publication Data

US 2010/0162264 A1  Jun. 24, 2010

Related U.S. Application Data

(60) Provisional application No. 61/106,807, filed on Oct. 20, 2008.

(51) Int. Cl.
*G06F 9/54* (2006.01)
*G06F 9/50* (2006.01)
*H04L 29/08* (2006.01)

(52) U.S. Cl.
CPC .............. *G06F 9/5038* (2013.01); *H04L 67/10* (2013.01); *H04L 67/2838* (2013.01)
USPC ........................................................ 719/313

(58) Field of Classification Search
CPC ..................... G06F 9/5038; H04L 67/2838

USPC .................................................. 719/313, 330
See application file for complete search history.

(56) References Cited

U.S. PATENT DOCUMENTS

2004/0123232 A1   6/2004  Hodges et al.
2005/0132086 A1*  6/2005  Flurry et al. ................. 709/238
(Continued)

OTHER PUBLICATIONS

Ten-Hove, R.; Walker, P., "Java Business Integration (JBI) 1.0" (Aug. 17, 2005) [retrieved from http://download.oracle.com/otndocs/jcp/jbi-1.0-fr-oth-JSpec/].*

(Continued)

*Primary Examiner* — Brian W Wathen
(74) *Attorney, Agent, or Firm* — Ben Tabor; David Andrews; Micky Minhas

(57) ABSTRACT

Service virtualization containers to aggregate service functionality from a plurality of services into an apparent service exhibiting the aggregated functionality. A plurality of service implementations is assigned to a service virtualization container. The container selects some of the service operations from the service implementations. One or more message characteristics are assigned to the service operations in one or more routing tables. A message is received at a service endpoint different from the service endpoints of any of the service implementations. A determination is made of one or more message characteristics. The one or more routing tables are consulted to select a determined service operation based on the message characteristics. The message is routed to the selected service implementation. Embodiments may also include functionality for aggregating metadata from service implementations and providing metadata based on the aggregated metadata to clients requesting metadata from a service virtualization container.

12 Claims, 7 Drawing Sheets

(56) References Cited

U.S. PATENT DOCUMENTS

| | | | |
|---|---|---|---|
| 2006/0085438 A1* | 4/2006 | Burst et al. .................. | 707/100 |
| 2006/0184936 A1 | 8/2006 | Abels et al. | |
| 2006/0242292 A1 | 10/2006 | Carter | |
| 2007/0064703 A1 | 3/2007 | Hernandez et al. | |
| 2007/0113238 A1 | 5/2007 | Smirnov et al. | |
| 2008/0005306 A1 | 1/2008 | Kushalnagar et al. | |
| 2008/0178169 A1* | 7/2008 | Grossner et al. ............ | 717/170 |
| 2009/0010168 A1* | 1/2009 | Yurchenko et al. .......... | 370/237 |
| 2009/0113449 A1* | 4/2009 | Balfe ........................... | 719/314 |
| 2010/0049628 A1* | 2/2010 | Mannava et al. .............. | 705/27 |

OTHER PUBLICATIONS

Brown, K.; Ellis, M., "Best Practices for Web Services Versioning" (Jan. 30, 2004) [retrieved from http://www.ibm.com/developerworks/webservices/library/ws-version/].*

Josuttis, N.M., "SOA in Practice" (Aug. 2007), O'Reilly Media Inc., pp. 1-324.*

Rourke McNamara, SOA and Service Virtualization, http://soa.sys-con.com/node/417740, Aug. 21, 2007, 5 Pages.

Solaris Containers—How Advances in Server Virtualization Will Simplify Service Manageability, http://www.sun.com/software/whitepapers/wp-svccont/wp-svccont.pdf, Feb. 2002, 22 Pages.

De-Ke Guo, Liang Zhao, Hong-Hui Chen, Xue-Shan Luo, Formalized Model and Implementation of Service Virtualization, 2005, 2 Pages.

Cisco Application-Oriented Networking, http://www.cisco.com/en/US/prod/collateral/modules/ps6438/product_data_sheet0900aecd802c1f9c.pdf, 2006, 10 Pages.

Edwin Van Wijk, Service Versioning with the Managed Service Engine, http://blogs.infosupport.com/blogs/edwinw/archive/2008/04/18/Service-Versioning-and-the-Managed-Service-Engine.aspx, Apr. 18, 2008, 3 Pages.

Managed Services Engine, Microsoft/Services, http://www.codeplex.com/servicesengine, May 31, 2008, 2 Pages.

* cited by examiner

SERVICE VIRTUALIZATION CONTAINER

This application claims the benefit of U.S. Provisional Application No. 61/106,807, filed Oct. 20, 2008, titled "Service Virtualization Container," which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Connection among computer systems may be facilitated by having clients connect to services.

Service orientation encourages the development of composable and reusable services that decouple the definition of a service contract from the service implementation. Although existing systems support the initial implementation of services in this fashion, subsequent development and modification of these services is much harder. For example, it is difficult to take and rearrange the executable code of several service implementations to create a new service or services with different contracts. As another example, it is difficult to add new service operations or change the implementation of an existing service operation without accessing and modifying the existing service implementation. These difficulties increase the cost of developing and maintaining service implementations as well as increase the chance of introducing an error into a previously working service implementation while attempting to add or modify functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein may be practiced in a computing environment. The embodiment includes a method for performing service virtualization by using one or more service virtualization containers to aggregate service functionality from a plurality of services into an apparent service exhibiting the aggregated functionality. The method includes assigning a plurality of service implementations to a service virtualization container. The container selects at least some of the service operations from the service implementations to implement service operations of the service virtualization container. One or more message characteristics are assigned to the service operations in one or more routing tables. A message is received at a service endpoint different from the service endpoints of any of the service implementations. A determination is made of one or more message characteristics from the message and message delivery properties. The one or more routing tables are consulted to select a determined service operation based on the message characteristics. A service implementation is selected, based on the message characteristics in the one or more routing tables, to which the message should be dispatched to perform the determined service operation. The message is routed to the selected service implementation.

Embodiments may also include functionality for aggregating metadata from service implementations and providing metadata based on the aggregated metadata to clients requesting metadata from a service virtualization container. In particular, embodiments may include, from metadata received from querying service implementations and routing tables, constructing aggregated metadata describing the service virtualization container. The aggregated metadata describes the service virtualization container as if the service virtualization container were a stand-alone service. A query may be received from a client for service metadata at a service endpoint different from the service endpoints of any of the service implementations. In response, the aggregated metadata description of the service virtualization container is provided to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein virtualize the execution of service operations across one or more service implementations by combining together a routing service with the service implementations to create a service virtualization container. The service virtualization container exposes a collection of service operations and maps incoming messages to service operations on the service implementations by extracting characteristics of the messages and message delivery properties, and selecting one or more of the potential routes. The service virtualization container describes its collection of service operations by synthesizing metadata together from the service implementations, routing tables, and configuration.

Figure 1A:
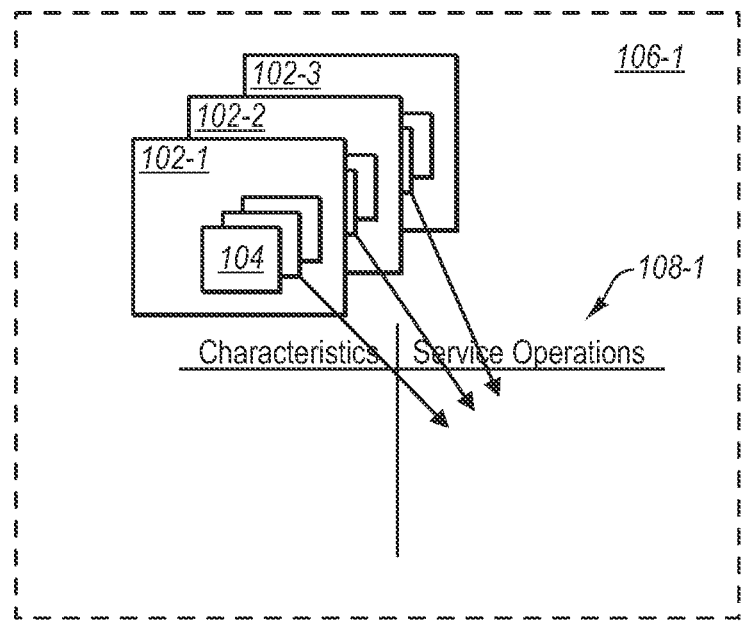
FIG. 1A illustrates a service virtualization container aggregating service operations.

Referring now to FIG. 1A, an example is illustrated. Consider a collection of one or more service implementations annotated as 102-1, 102-2, and 102-3 specifically and referred to herein as 102 generically. Each service implementation 102 exposes one or more service operations annotated generically as 104, and specifically as 104-X where X is some integer. From this collection of service operations 104, a set have been chosen that are to be made available, as if they were part of a single service, by the service virtualization container 106-1 (106 may be used to refer to virtualization containers generically). The chosen set of service operations 104 may vary in size from one to all of the members of the aggregated collection. As illustrated in FIG. 1A, and as will be discussed in more detail below, a member of the chosen set of service operations 104 may be represented in one or more routing tables 108-1 that assign message characteristics to service operations 104 and/or service implementations. Some immediate complications of this aggregation may be apparent, such as when bringing together two service operations that have the same name or type signature. These complications will be addressed after the basic process is described.

Often embodiments will be used for aggregating together multiple service implementations, as is illustrated in FIG. 1A. However, as illustrated in FIG. 1, embodiments may be used to provide disaggregation. For example, if multiple instances of service virtualization containers 106-2, 106-3, 106-4, and 106-5 are implemented, each instance acting on a common service implementation 102-4, then each of the implementations of service virtualization containers 106-2, 106-3, 106-4, and 106-5 may variously provide a subset of service operations from the common service implementation so as to expose many seemingly independent services that nevertheless have a single service implementation 102-4. In the example illustrated, the virtualization container 106-4 virtualizes the service operation 104-1. The virtualization container 106-2 virtualizes the service operation 104-2. The virtualization container 106-5 virtualizes the service operation 104-3. The virtualization container 106-3 virtualizes the service operation 104-4. Because the virtualization containers 106 are exposed as a service, these aggregations and disaggregations may be composed together without limit through the use of multiple instances of virtualization containers. For clarity, all of the examples used in the description will be simple aggregations.

Figure 2:
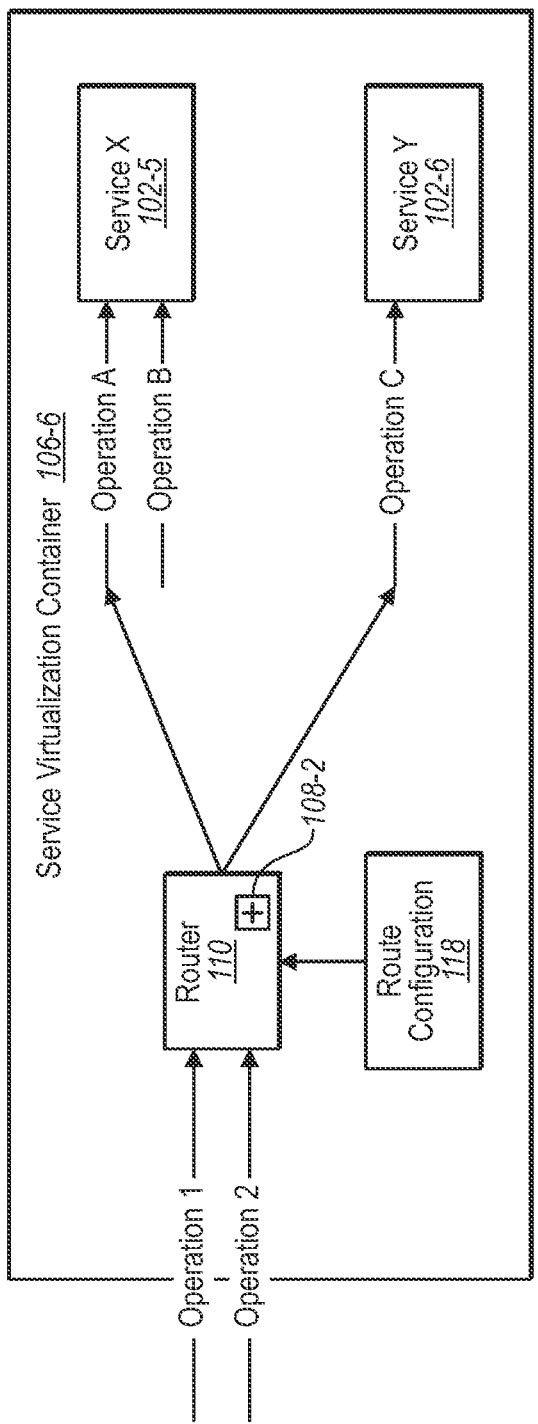
FIG. 2 illustrates one implementation of a service virtualization container.

One basic component of one embodiment is a service virtualization container 106-6, shown in FIG. 2, that incorporates a router service 110 together with the various service implementations illustrated as 102-5 and 102-6. The router service 110 is responsible for translating between the contract of the aggregated service and the contracts of the service implementations.

Figure 3:
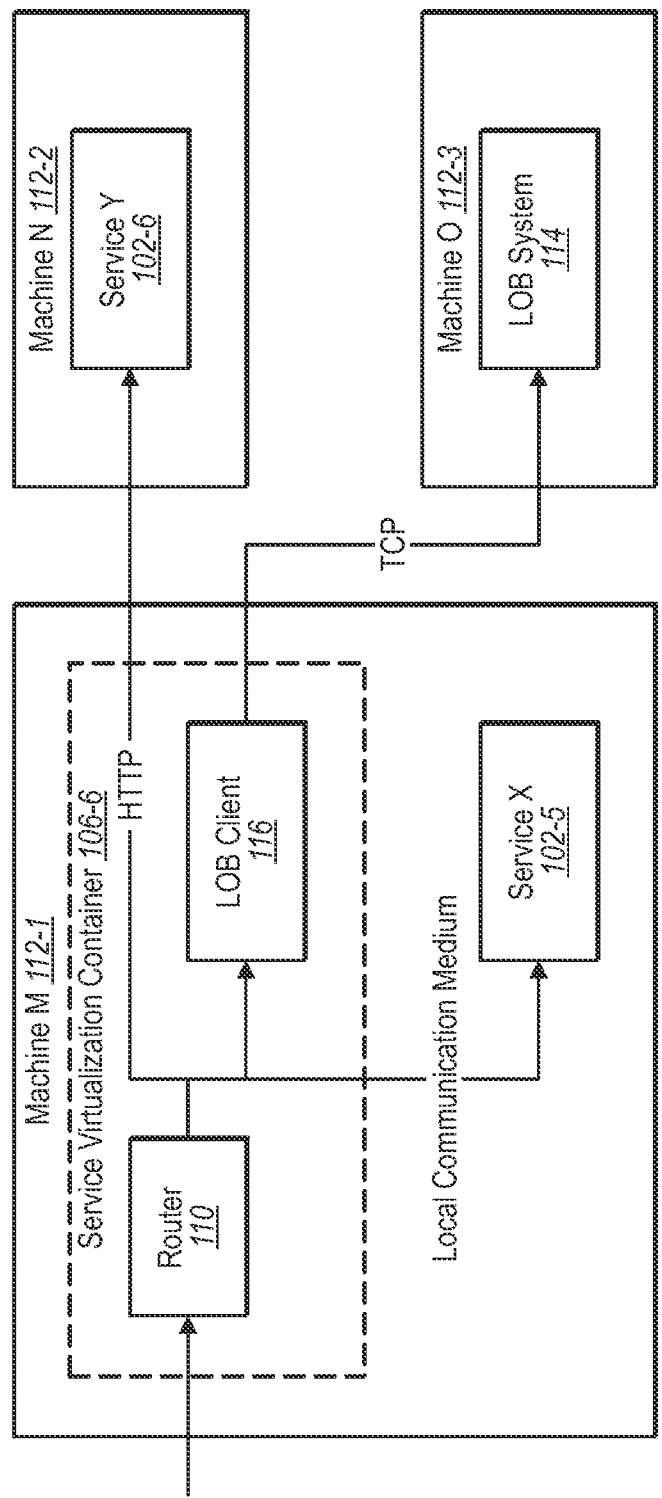
FIG. 3 illustrates an alternate representation of an implementation of a service virtualization container.

Although this solution is described as a container, the container is logical rather than physical. As shown in FIG. 3, the service implementations 102-5 and 102-6 may connect with the router service 110 using various topologies, some of which do not co-locate the router service and service implementations. For example, FIG. 3 illustrates three different physical machines, machine M 112-1, machine N 112-2, and machine O 112-3. In the example illustrated, the service X 102-5 may be co-located on the same machine 112-1 as the router 110 and the software code implementing the service virtualization container 106-6. A different service, service Y 102-6, may be located on an external physical machine 112-2 accessible through HTTP. Still another service implementation may be implemented on an external machine O 112-3 as part of a Line Of Business (LOB) system 114 accessible through TCP using a LOB client 116 on the machine M 112-1.

Returning to the description of FIG. 2, when the service virtualization container 106-6 is instantiated, a router service 110 is started and the one or more routing tables 108-2 of the service virtualization container 106-6 are populated from route configuration data 118. These routes define both the service operations exposed by the service virtualization container 106-6 as well as the mapping between the exposed service operations and the service operations 104 (see FIGS. 1A and 1B) of the service implementations 102. For example, the router service 110 may expose an Operation 1 that maps to an Operation A of Service X 102-5 and an Operation 2 that maps to an Operation C of Service Y 102-6. The service implementations 102 may have other service operations that are not wired up to the router service, such as Operation B of Service X 102-5. These unconnected service operations are uncallable through the service virtualization container 106-6 interface.

When a message arrives at the service virtualization container 106-6, the following process is applied.

1. The message is received at the router service 110 service endpoint.
2. The router service 110 determines one or more message characteristics from the message and/or message delivery properties. The message characteristics provide the information needed for the router service 110 to determine the disposition of the message. Message characteristics may be obtained or derived from any one of one of more different sources. For example, a message characteristic might be created from an action parameter on the message that identifies that service operation that the message is destined for. Message characteristics may be computed from headers or other metadata associated with the message. Message characteristics may include information related to a transport on which a message was received. Message characteristics may relate to a protocol of the message. Message characteristics may relate to identification information about from whom the message was received.
3. Based on the message characteristics, the router service 110 selects one of the routes in the one or more routing tables 108-2.
4. According to the route, the router service 110 sends the message to the indicated address. The address corresponds to one of the service endpoints of one of the service implementations 102.
5. The service implementation 102 receives the message and dispatches it to the appropriate service operation 104.

Before and after the message is routed, some embodiments may transform the message. An example of message transformation would be to change the format of the message from a common format used by the service virtualization container 106 to a specific format used by one of the service implementations 102.

A common difficulty with aggregating service operations is that two of the service operations may have the same name or type signature, thus making their use ambiguous. For example, assume that Operation A and Operation C in the example both had the same name. In that case, one embodiment might permit renaming one or both of the service operations as part of publishing them at the router service 110. The router service 110 would translate the name back to the original while routing the message to the service implementation 102. Although renaming does not always require message transformation, the two may be frequently used together.

Depending on the specific embodiment of the service implementation host, at step 5 shown above, there may be no currently running instance of the service implementation 102 ready to process the message. In that case, the service implementation 102 may be activated by creating a running instance before the message can be received.

Part of the use of the router service 110 is to abstract the location of the service implementation 102. As discussed previously, FIG. 3 depicts three common embodiments for connecting to a service implementation 102.

The service implementation 102 may be located together with the router service 110, in which case they are often connected using a high-speed local communication medium to avoid performance degradation. An example of this is illustrated in FIG. 3 where the router service 110 is co-located on the same machine M 112-1 with the service X 102-5.

The service implementation 102 could also be located on another machine 112 on the network, in which case they could be connected using any inter-machine communication medium supported by the service implementation 102. An example of this is illustrated in FIG. 3, where service Y 102-6 is located on a different machine N 112-2 than the router service 110. Communication takes place through HTTP, which is supported by the service implementation Y 102-6.

Additionally, the service implementation 102 might be a line-of-business (LOB) system. A line-of-business system does not expose a service interface, but rather is accessed through a client implementation. LOB systems are found throughout enterprises, for example in payroll and HR systems. In that case, the service virtualization container 106 could act as the client portion of the LOB system, allowing the LOB system operations to be exposed equally well as service operations from the service virtualization container 106. FIG. 3 illustrates an LOB client 116 implemented as part of the virtualization container 106-6 on machine M 112-1 that communicates through TCP with the LOB system 114 on machine O 112-3.

Embodiments may also facilitate service versioning. When a new version of a service operation 104 is developed, it is often desirable to leave the original version of the service operation 104 in place for some time, or possibly even indefinitely. Rather than exposing these versions as independent service operations 104, an embodiment may expose a single copy of the operation 104. The router service 110 could then apply various policies to select between the different versions.

For example, the client might supply a version hint in the message to specify a particular version. This version hint would be one of the message characteristics used by the router service 110. Messages that do not contain a version hint might be assigned to the oldest version of the service operation 104, the newest version of the service operation 104, or a specific version of the service operation 104 depending on the compatibility between the various versions.

As another example, the router service 110 might select a particular version depending on a message characteristic about the identity of the caller, such as an IP address or user name, so that users that are part of a beta program might get a newer version of the service operation 104 than ordinary users.

As another example, the router service may allocate a portion of the incoming requests to each version of the service operation 104. If everyone is moved to a new version of a service operation 104 at the same time, it may be discovered only afterwards that the new version of the service operation 104 has a flaw and all users may be impacted. Instead, a percentage, such as 1% of the incoming requests, can be migrated to the new version of the service operation 104 today, and if no problems occur, the percentage migrated to the new version of the service operation 104 may be gradually increased over time until there is confidence that the old version of the service operation 104 is no longer needed.

As an additional example, the service operation 104 may be associated with some long-running state that was constructed by a particular version of the service implementation 102. Although some embodiments may be able to migrate the long-running state from one version of a service operation 104 to another as necessary, other embodiments may require that only the original version of a service operation 104 be used with the long-running state.

Figure 4:
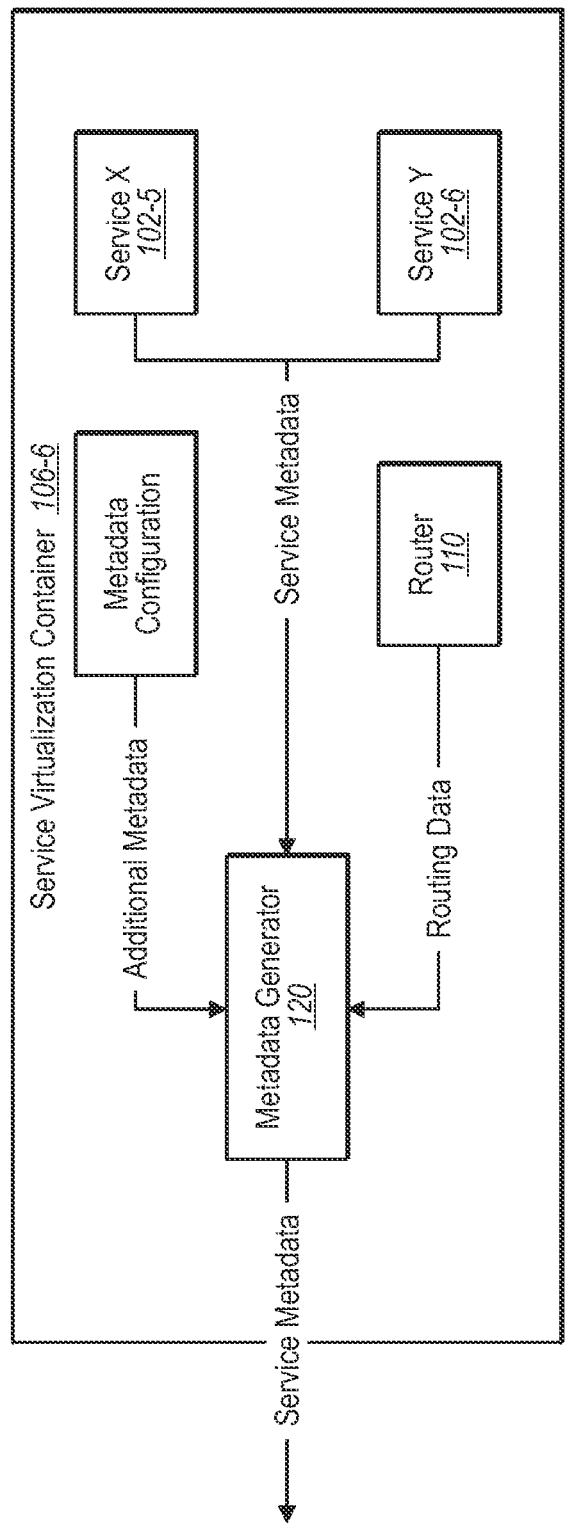
FIG. 4 illustrates aggregating metadata to generate metadata for a service virtualization container

Just as the service implementations 102 may choose to expose metadata to describe themselves, in some embodiments the service virtualization container 106 may provide metadata that describes the synthesized service. FIG. 4 illustrates this construction process. The service virtualization container 106-6 generates metadata at a metadata generator programmatic module 120 by drawing upon the metadata of the service implementations 102-5 and 102-6 and the configuration of the routes in the one or more routing tables 108-2 (see FIG. 2). Because the metadata generator 120 draws upon all of these sources, the generated metadata represents an accurate external view of the service virtualization container 106-6. For example, if a service operation is renamed, the metadata generator 120 can publish the internal description of the service operation 104 under the external name by analyzing the transformations and routes used to perform the renaming.

In some embodiments, the queried metadata may be supplemented with configured metadata.

An example of this supplementation is when one of the service implementations is an LOB system that does not support metadata query.

Another example of this supplementation is frequently seen together with service versioning. Although there may continue to be routes for obsolete service operations 104 so that existing client implementations continue to work, those service operations 104 might not be advertised in the generated metadata so that new client implementations would not use them. Thus, supplementations may add, remove, or change portions of the queried metadata depending on the purpose of the supplementation.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 1B:
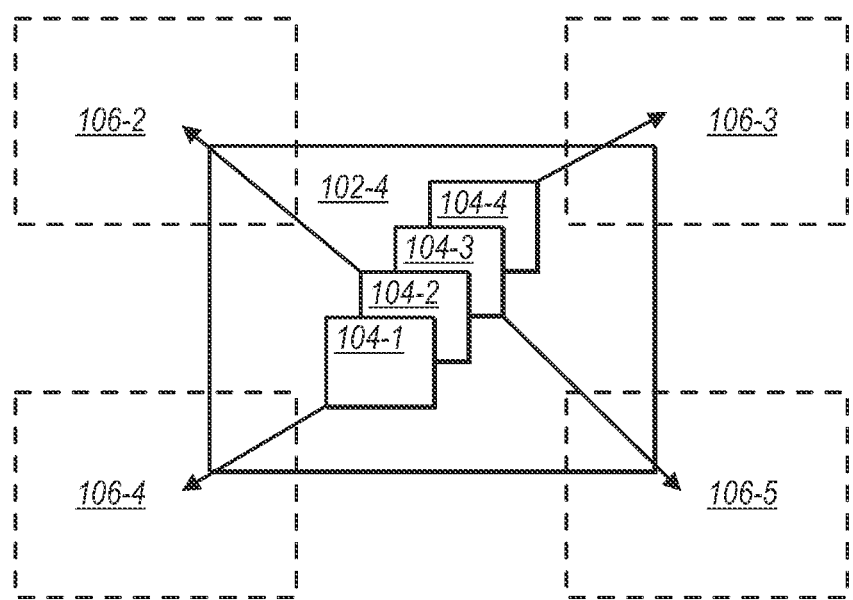
FIG. 1B illustrates a plurality of service virtualization containers disaggregating service operations from a single service implementation.
Figure 5:
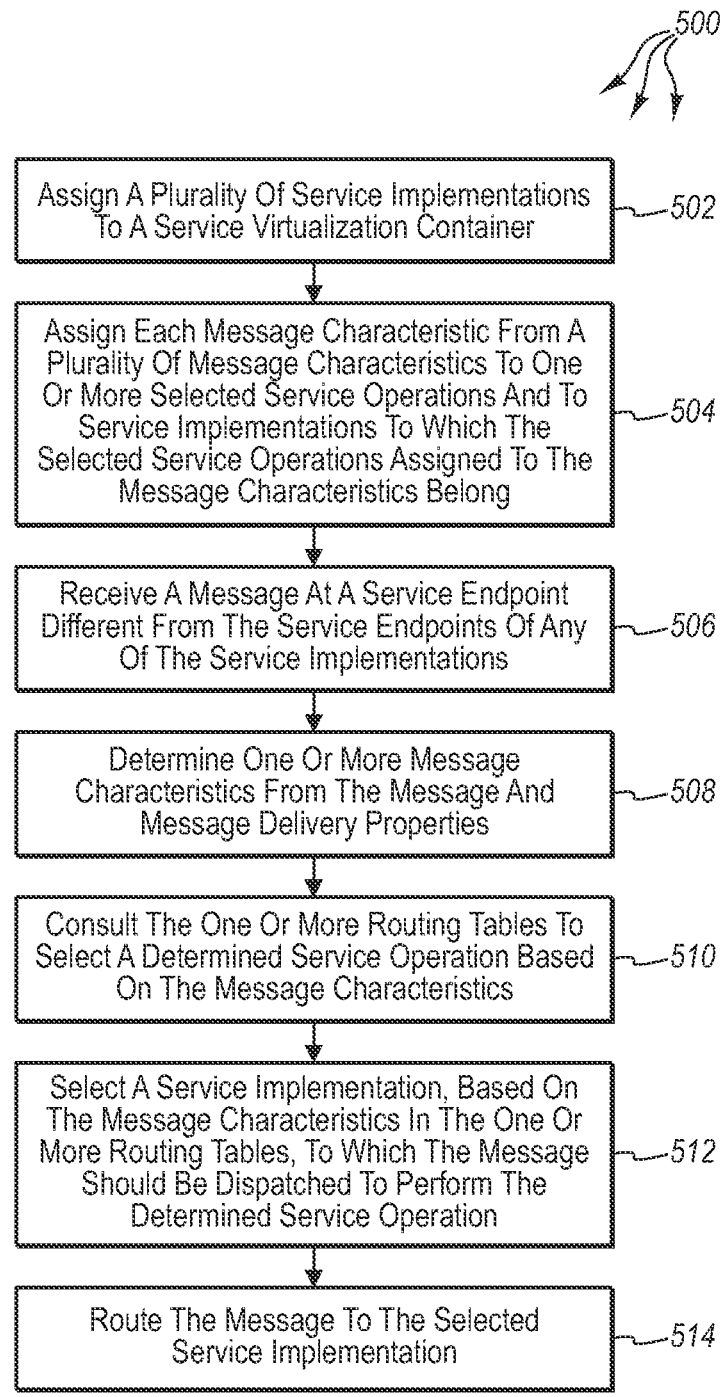
FIG. 5 illustrates a method of performing service virtualization.

Referring now to FIG. 5, a method 500 is illustrated. The method 500 may be practiced in a computing environment and includes computer implemented acts for performing service virtualization by using one or more service virtualization containers to aggregate service functionality from a plurality of services into an apparent service exhibiting the aggregated functionality. The method 500 includes assigning a plurality of service implementations to a service virtualization container (act 502). Each service implementation has one or more service operations belonging to their respective service implementation. The service operations each include computer executable instructions that when executed by a processor are capable of causing computer implemented tasks to be performed. The container selects at least some of the service operations from the service implementations to implement service operations of the service virtualization container. For example, as illustrated in FIGS. 1A and 1B, the service implementations 102 may be assigned to the service containers 106. The service containers 106 select service operations to expose.

The method 500 further includes an act of assigning each message characteristic from a plurality of message characteristics to one or more of the selected service operations and to service implementations to which the selected service operations assigned to the message characteristic belong (act 504). Assigning may be performed by making entries in one or more routing tables. FIG. 1A illustrates a routing table 108-1 that correlates message characteristics with service operations 104.

The method 500 further includes an act of receiving a message at a service endpoint different from the service endpoints of any of the service implementations (act 506). For example, FIGS. 2 and 3 illustrate operation request messages being received at the virtualization container 106-6 and machine M 112-1 respectively.

The method 500 further includes an act of determining one or more message characteristics from the message and message delivery properties (act 508). The method 500 further includes an act of consulting the one or more routing tables to select a determined service operation based on the message characteristics (act 510). For example, the table 108-2 shown in FIG. 1A may be consulted to select a service operation 104 based on message characteristics.

The method 500 further includes an act of selecting a service implementation, based on the message characteristics in the one or more routing tables, to which the message should be dispatched to perform the determined service operation (act 512). The message is routed to the selected service implementation (act 514).

The method 500 may be performed where at least one of the service operations is a different version of another of the service operations. For example, service operations may be updated to perform different functionality or to accomplish the same functionality using different processes. This may be done to address security concerns, performance issues, hardware or related software upgrades or changes, etc. In some embodiments where different versions of the same service operation are selected by a container, the method 500 may be performed where one or more of the message characteristics is a version hint for selecting a version of a service operation when more than one version of a service operation has been selected by the container. In some such embodiments, the act of selecting the service operation, based on the message characteristics in the one or more routing tables (act 510) includes selecting a service operation based on a comparison of the version of the service operation to information related to the version hint.

In an alternative or additional embodiment when at least one of the service operations is a different version of another of the service operations the method 500 may be performed where the act of selecting the service operation, based on the message characteristics in the one or more routing tables, is selected based on the newest available version of the service operation when more than one version of a service operation has been selected by the container. In some embodiments, this may be performed when no version hint is available.

In an alternative embodiment when at least one of the service operations is a different version of another of the service operations the method 500 may be performed where the act of selecting the service operation, based on the message characteristics in the one or more routing tables, is selected based on the oldest available version of the service operation when more than one version of a service operation has been selected by the container. This may be performed in some embodiments when no version hint is available.

In an alternative embodiment when at least one of the service operations is a different version of another of the service operations the method 500 may be performed where one of the message characteristics is a version of preexisting instance state associated with the message. For example if a session has begun with one version and before the session is completed, a new version is introduced, it may be advantageous to complete session operations with the old version. The method may further include an act of examining the preexisting instance state associated with the message to determine if the pre-existing instance state is appropriate for a selected version of a service operation and if the instance state is unsuitable for the selected version of the service operation, an act of migrating the instance state to a different version of the service operation.

The method 500 may be performed where the one or more routing tables assigns one or more message characteristics to a first service operation and the same one or more message characteristics to a second service operation. In some examples of this embodiment, the act of selecting the service operation includes selecting a service operation based on a desired percentage of messages being routed to a given service operation. As noted previously, this embodiment may be implemented, for example, to perform an ordered migration to a new version of a service operation.

In other examples of embodiments where the method 500 may be performed where the one or more routing tables assigns one or more message characteristics to a first service implementation and the same one or more message characteristics to a second service implementation, the act of selecting the service implementation may include selecting a service implementation based on round robin allocation. In an alternative to this embodiment, the act of selecting the service implementation may include selecting a service implementation based on the respective loads of the two service implementations.

The method 500 may be performed where one or more of the message characteristics identifies the sender of the message. In some of these embodiments, the act of selecting a service operation may include selecting a service operation from among those that the identified user is permitted access. In some of these embodiments, the act of selecting a service implementation may include selecting a service implementation based on a service level agreement with the identified user.

The method 500 may be performed where at least one of the service implementations is an externally hosted and running application. For example, the externally hosted and running application may be a line-of-business system. In this embodiment, the act of routing the message to the selected service implementation may include using a client to invoke operations on the line-of-business system.

The method 500 may further include an act of applying a message processing pipeline to transform the message.

The method 500 may be performed where at least one of the service operations appears in the one or more routing tables with a different name than one used by a service implementation to which the service operation belongs. This may be done to prevent conflicts by renaming one or more service operations with the same name. As described previously, a changed name could be translated back to the original name by using a router service.

The method 500 may further include an act of checking for a running instance of the selected service implementation. In this embodiment, if there is no running instance of the selected service implementation, the method 500 may further include an act of activating the service implementation to create a running instance before routing the message to the selected service implementation.

Figure 6:
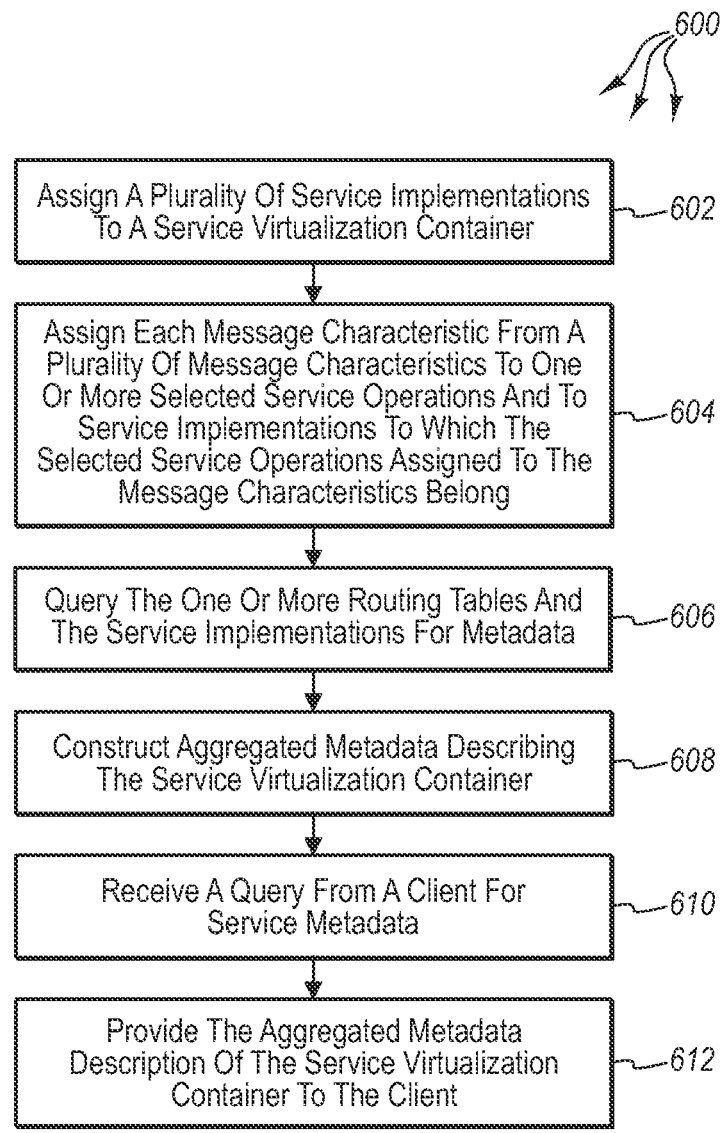
FIG. 6 illustrates another method of performing service virtualization.
Figure 7:
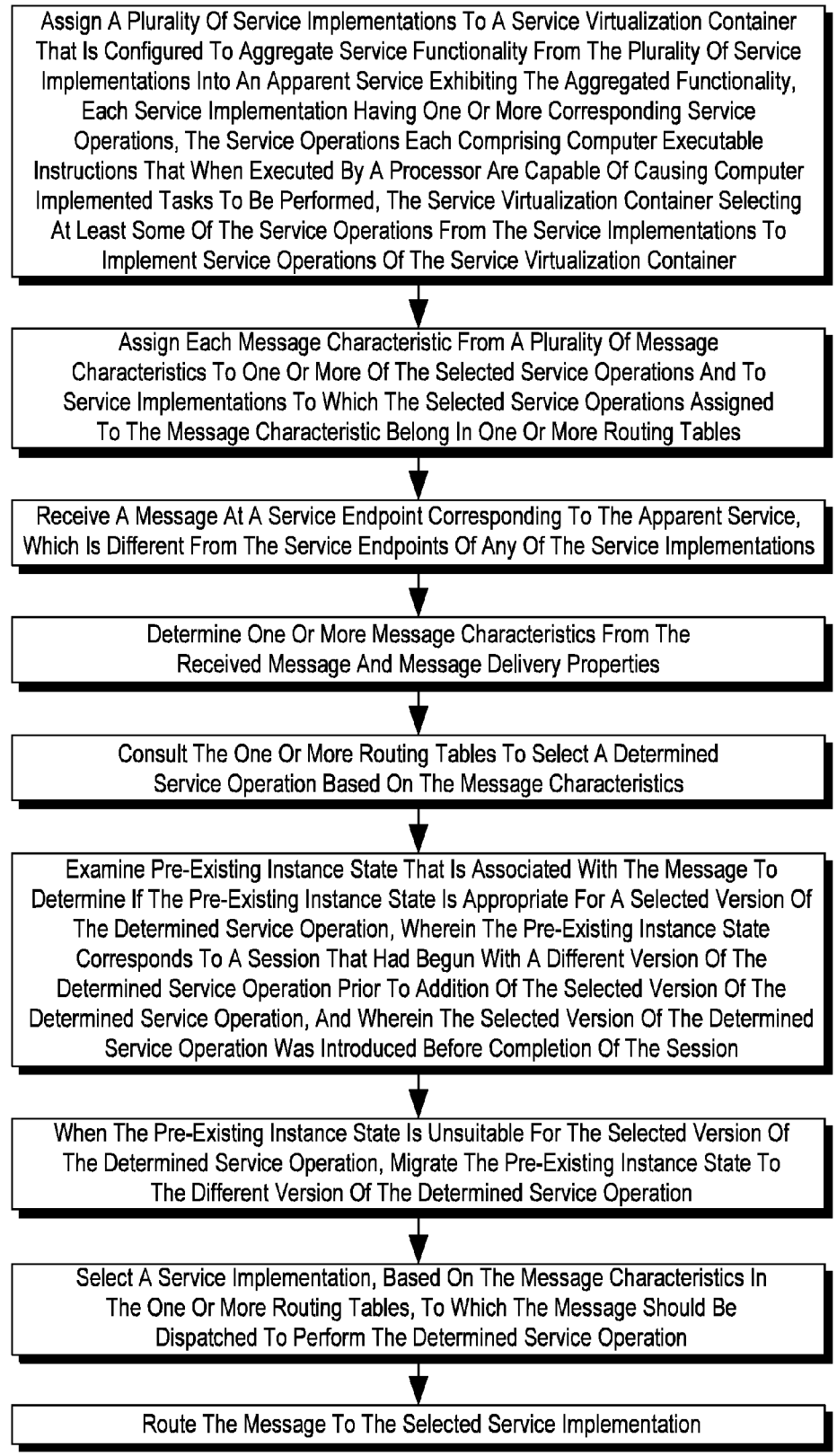
FIG. 7 illustrates another method of performing service virtualization.

Referring now to FIG. 6, an embodiment directed to metadata aggregation is illustrated. FIG. 6 includes a method 600 that may be practiced in a computing environment. The method includes acts for performing service virtualization by using one or more service virtualization containers to aggregate service functionality from a plurality of services into an apparent service exhibiting the aggregated functionality. The method 600 includes an act of assigning a plurality of service implementations (e.g. service implementations 102 shown in FIGS. 1A and 1B) to a service virtualization container (e.g. containers 106 illustrated in FIGS. 1A and 1B) (act 602). Each service implementation has one or more service operations (e.g. service operations 104 illustrated in FIGS. 1A and 1B) belonging to their respective service implementation. The service operations each include computer executable instructions that when executed by a processor are capable of causing computer implemented tasks to be performed. The container selects at least some of the service operations from the service implementations to implement service operations of the service virtualization container.

The method 600 further includes an act of assigning each message characteristic from a plurality of message characteristics to one or more of the selected service operations and to service implementations to which the selected service operations assigned to the message characteristic belong (act 604). This may be done, for example, by correlating messages characteristics with service operations in one or more routing tables (e.g. routing tables 108 illustrated in FIG. 1A).

The method 600 further includes an act of querying the one or more routing tables and the service implementations for metadata (act 606). From metadata received from the act of querying, the method 600 further includes constructing aggregated metadata describing the service virtualization container (act 608). The aggregated metadata describing the service virtualization container is presented as if the service virtualization container were a stand-alone service.

The method 600 further includes an act of receiving a query from a client for service metadata (act 610). The query may be received at a service endpoint different from the service endpoints of any of the service implementations. For example, as illustrated in FIG. 4, the query may be received by the service virtualization container 106-6 rather than directly at the service 102-5 or 102-6.

The method 600 further includes providing the aggregated metadata description of the service virtualization container to the client (act 612).

The method 600 further may be performed where at least some of the aggregated metadata is provided separately as part of the service virtualization container configuration.

The method 600 further may be performed where one or more of the service operations appears in the one or more routing tables but is excluded from the aggregated metadata. For example, while the service virtualization container 106 may have the functionality for routing to a given service operation, the service operation may be excluded from the aggregated metadata such that the service virtualization container 106 appears as a service with less functionality than it actually has. This may be useful when it is desirable to expose only a limited set of service operations.

The method 600 further may be performed where one or more of the service operations appears in the one or more routing tables but is excluded from the aggregated metadata based on the service operation having been deprecated. For example, a new service operation may have superseded another existing service operation, such that the new service operation is included in the aggregated metadata, while the deprecated service operation is not included in the aggregated metadata even though both service operations may exist in the routing tables.

The method 600 further may be performed where one or more of the service operations appears in the one or more routing tables but is excluded from the aggregated metadata based on the identity of the issuer of the metadata query. For example, for security reasons which do not allow a given user to access certain service operations, when a given user requests the metadata, then the aggregated metadata may not expose service operations that the given user will not have access to.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method comprising:
    an act of assigning a plurality of service implementations to a service virtualization container that is configured to aggregate service functionality from the plurality of service implementations into an apparent service exhibiting the aggregated functionality, each service implementation having one or more corresponding service operations, the service operations each comprising computer executable instructions that when executed by a processor are capable of causing computer implemented tasks to be performed, the service virtualization container selecting at least some of the service operations from the service implementations to implement service operations of the service virtualization container;
    an act of assigning each message characteristic from a plurality of message characteristics to one or more of the selected service operations and to service implementations to which the selected service operations assigned to the message characteristic belong in one or more routing tables;
    an act of receiving a message at a service endpoint corresponding to the apparent service, which is different from the service endpoints of any of the service implementations;
    an act of determining one or more message characteristics from the received message and message delivery properties;
    an act of consulting the one or more routing tables to select a determined service operation based on the message characteristics;
    an act of examining pre-existing instance state that is associated with the message to determine if the pre-existing instance state is appropriate for a selected version of the determined service operation, wherein the pre-existing instance state corresponds to a session that had begun with a different version of the determined service operation prior to addition of the selected version of the determined service operation, and wherein the selected version of the determined service operation was introduced before completion of the session;
    when the pre-existing instance state is unsuitable for the selected version of the determined service operation, an act of migrating the pre-existing instance state to the different version of the determined service operation;
    an act of selecting a service implementation, based on the message characteristics in the one or more routing tables, to which the message should be dispatched to perform the determined service operation; and
    an act of routing the message to the selected service implementation.

2. The method of claim 1, wherein the one or more routing tables assigns one or more message characteristics to a first service operation and the same one or more message characteristics to a second service operation, and wherein the method further comprises:
    an act of selecting a service operation based on selecting a service operation based on a desired percentage of messages being routed to a given service operation.

3. The method of claim 1, wherein the one or more routing tables assigns one or more message characteristics to a first service implementation and the same one or more message characteristics to a second service implementation, and wherein the method further comprises:
    an act of selecting a service implementation based on selecting a service implementation based on the respective loads of the two service implementations.

4. The method of claim 1, wherein one or more of the message characteristics identifies the sender of a message, and wherein the method further comprises:
    an act of selecting a service operation based on selecting a service operation from among those that the identified user is permitted access.

5. The method of claim 1, wherein one or more of the message characteristics identifies the sender of the message, and wherein the method further comprises:
    an act of selecting a service implementation based on selecting a service implementation based on a service level agreement with the identified user.

6. The method of claim 1, wherein at least one of the service implementations is an externally hosted and running application.

7. The method of claim 6, wherein the externally hosted and running application is a line-of-business system, and wherein the act of routing the message to the selected service implementation comprises using a client to invoke operations on the line-of-business system.

8. The method of claim 1 further comprising:
an act of applying a message processing pipeline to transform the message.

9. The method of claim 1, wherein at least one of the service operations appears in the one or more routing tables with a different name than one used by a service implementation to which the service operation belongs.

10. The method of claim 1, further comprising:
an act of checking for a running instance of the selected service implementation; and, if there is no running instance of the selected service implementation, an act of activating the service implementation to create a running instance before routing the message to the selected service implementation.

11. In a computing environment, one or more hardware storage devices having stored thereon computer executable instructions that, when executed by a processor, cause the following to be performed:
an act of assigning a plurality of service implementations to a service virtualization container that is configured to aggregate service functionality from the plurality of service implementations into an apparent service exhibiting the aggregated functionality, each service implementation having one or more corresponding service operations, the service operations each comprising computer executable instructions that when executed by a processor are capable of causing computer implemented tasks to be performed, the service virtualization container selecting at least some of the service operations from the service implementations to implement service operations of the service virtualization container;
an act of assigning each message characteristic from a plurality of message characteristics to one or more of the selected service operations and to service implementations to which the selected service operations assigned to the message characteristic belong in one or more routing tables;
an act of receiving a message at a service endpoint corresponding to the apparent service, which is different from the service endpoints of any of the service implementations;
an act of determining one or more message characteristics from the message and received message delivery properties;
an act of consulting the one or more routing tables to select a determined service operation based on the message characteristics;
an act of examining pre-existing instance state that is associated with the message to determine if the pre-existing instance state is appropriate for a selected version of the determined service operation, wherein the pre-existing instance state corresponds to a session that had begun with a different version of the determined service operation prior to addition of the selected version of the determined service operation, and wherein the selected version of the determined service operation was introduced before completion of the session;
when the pre-existing instance state is unsuitable for the selected version of the determined service operation, an act of migrating the pre-existing instance state to the different version of the determined service operation;
an act of selecting a service implementation, based on the message characteristics in the one or more routing tables, to which the message should be dispatched to perform the determined service operation; and
an act of routing the message to the selected service implementation.

12. A computer system, comprising:
one or more processors; and
one or more computer-readable media storing computer-executable instructions that, when executed, implement a method, comprising:
assigning a plurality of service implementations to a service virtualization container that is configured to aggregate service functionality from the plurality of service implementations into an apparent service exhibiting the aggregated functionality, each service implementation having one or more corresponding service operations, the service operations each comprising computer executable instructions that when executed by a processor are capable of causing computer implemented tasks to be performed, the service virtualization container selecting at least some of the service operations from the service implementations to implement service operations of the service virtualization container;
assigning each message characteristic from a plurality of message characteristics to one or more of the selected service operations and to service implementations to which the selected service operations assigned to the message characteristic belong in one or more routing tables;
receiving a message at a service endpoint corresponding to the apparent service, which is different from the service endpoints of any of the service implementations;
determining one or more message characteristics from the received message and message delivery properties;
consulting the one or more routing tables to select a determined service operation based on the message characteristics;
an act of examining pre-existing instance state that is associated with the message to determine if the pre-existing instance state is appropriate for a selected version of the determined service operation, wherein the pre-existing instance state corresponds to a session that had begun with a different version of the determined service operation prior to addition of the selected version of the determined service operation, and wherein the selected version of the determined service operation was introduced before completion of the session;
when the instance state is unsuitable for the selected version of the determined service operation, an act of migrating the pre-existing instance state to the different version of the determined service operation;
selecting a service implementation, based on the message characteristics in the one or more routing tables, to which the message should be dispatched to perform the determined service operation; and
routing the message to the selected service implementation.

* * * * *